UNITED STATES PATENT OFFICE.

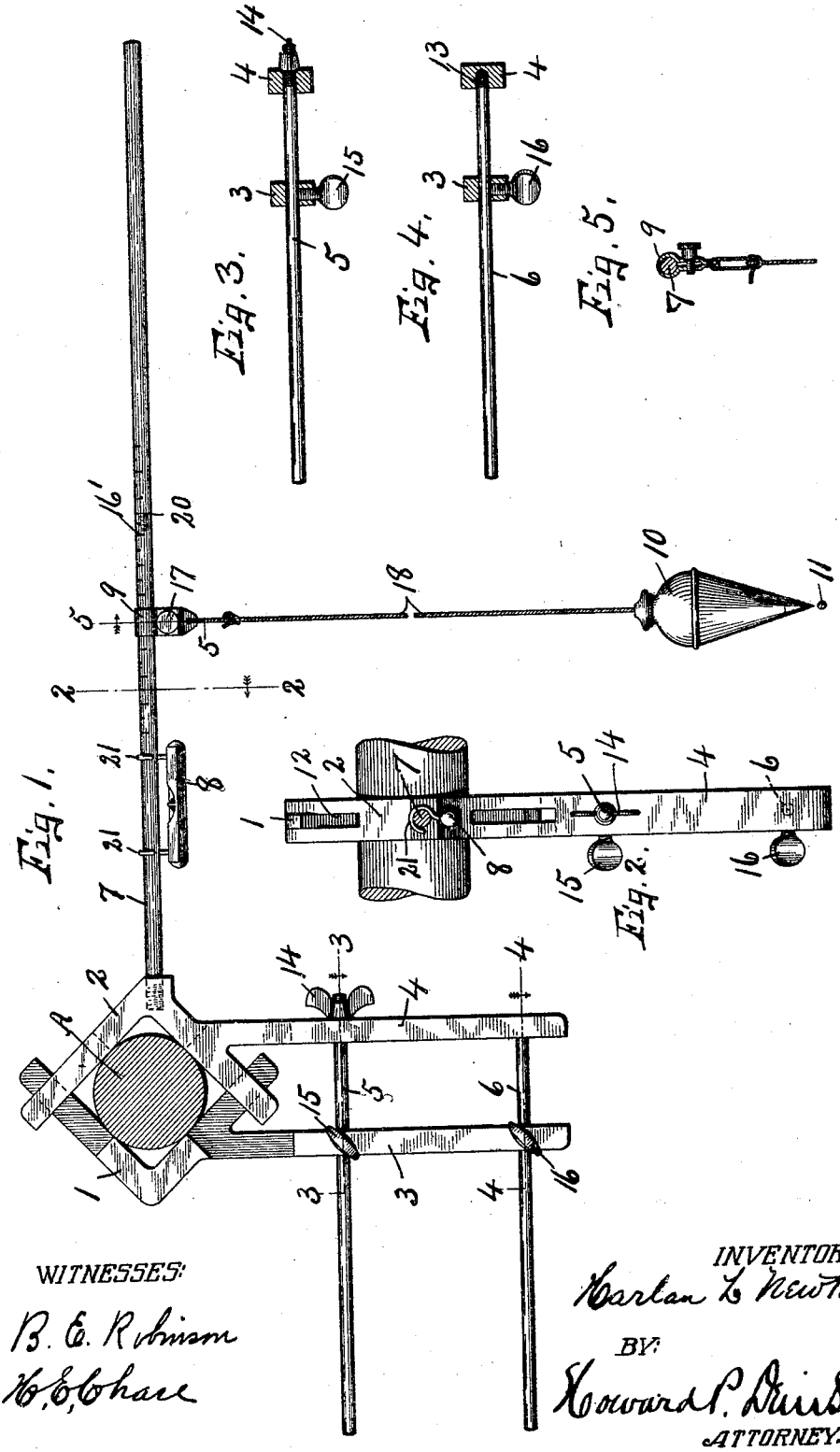

HARLAN L. NEWTON, OF SANDYCREEK, NEW YORK, ASSIGNOR OF ONE-HALF TO MOREAU J. SALISBURY AND ONE-HALF TO MINNIE NEWTON.

SHAFT-ALINER.

No. 807,085.      Specification of Letters Patent.      Patented Dec. 12, 1905.

Application filed May 31, 1905. Serial No. 262,973.

*To all whom it may concern:*

Be it known that I, HARLAN L. NEWTON, of Sandycreek, in the county of Oswego, in the State of New York, have invented new and useful Improvements in Shaft-Aliners, of which the following, taken in connection with the accompanying drawings, is a full, clear, and exact description.

This invention relates to improvements in shaft-aliners in which two opposed rectangular jaws are slidably interlocked with each other to receive and center themselves upon the shaft to be alined, one of the jaws having a laterally-extending arm equipped with a level and plumb, the former to bring the arm to the same level when the jaws are applied to different parts of the shaft and the plumb coöperating with a straight line or cord by which the vertical and horizontal alinements of the shaft are determined.

The primary object is to provide a simple and efficient instrument by which a shaft of any length may be adjusted at any point or points to the same relative position with reference to a previously-prepared straight line or cord.

Another object is to render the work of alining the shaft as easy and expeditious as possible by suspending the jaws upon the shaft in such manner that the horizontal arm will be automatically brought toward a level by the mere gravity of the pendent arms with which the jaws are provided, so that when the lever is applied only a slight adjustment, if any, is required to bring the horizontal arm to an exact level position, whereupon the jaws are rigidly clamped upon the shaft.

A more specific object is to enable the instrument to be used in connection with a tightly-drawn cord or line placed close to the floor-line of the room in which the shaft is located, thereby facilitating the arrangement of the cord or line in both horizontal and vertical planes parallel to the axis in which it is desired to locate the shaft.

Other more specific objects and uses will be brought out in the following description.

In the drawings, Figure 1 is a side elevation of my improved alining instrument shown as operatively mounted upon a shaft and as associated with the line or cord with which the shaft is to be alined. Fig. 2 is a sectional view taken on line 2 2, Fig. 1. Figs. 3, 4, and 5 are sectional views taken, respectively, on lines 3 3, 4 4, and 5 5, Fig. 1.

As best seen in Fig. 1, this alining instrument consists, essentially, of a pair of rectangular open-sided jaws 1 and 2, each having a pendent arm 3 and 4, which are provided with transverse apertures in planes one above the other for receiving guide-rods 5 and 6, the jaw 2 being provided with a laterally-projecting substantially horizontal arm 7, upon which is supported a slidable level 8 and a sliding gage 9, the latter receiving and supporting a pendent plumb 10, adapted to register with an alining cord or line 11.

The arms of the jaw 2 are bifurcated for forming open-ended slots 12 to receive the adjacent arms of the jaw 1, said latter arms being reduced in width to fit and slide in the slots 12, thereby interlocking one jaw with the other and permitting said jaws to be brought close together or adjusted radially with reference to the shaft to fit and center themselves upon any shaft within certain limits of size or diameter. These jaws are simultaneously applied to opposite faces of the shaft which is to be alined, and the pendent arms 3 and 4 are of sufficient weight to substantially counterbalance each other and to partially counterbalance the weight of the arm 7, so that when the instrument is thus applied to the shaft before the plumb 10 is attached the arm 7 is brought toward a substantially horizontal or level position.

The rods 5 and 6 are arranged in parallel lines horizontally one above the other parallel with the rod 7 and are both threaded at one end, the threaded end of the rod 6 being screwed into a threaded aperture 13 in the pendent arm 4, and its other end extends through a smooth bore in the pendent arm 3.

The guide-rod 5 is passed entirely through smooth apertures in both of the pendent arms 3 and 4, and its threaded end is provided with a nut 14 for a purpose presently described.

The pendent arm 3 is provided with two threaded apertures and set-screws 15 and 16, one for each of the rods 5 and 6, which when the jaws 1 and 2 are brought into close engagement with the opposite faces of the shaft, as A, are screwed tightly against their respective rods 5 and 6, thereby clamping said jaws reasonably tight upon the shaft with the bar 7 in a substantially horizontal position, so that the operator may with one hand engage the arm 7 and bring it to an exact level position, as indicated by the level 8, while with the other hand he may readily tighten the thumb-nut 14 to more firmly clamp the jaws 1 and 2 upon the shaft. Previous to this operation, and, in fact, the first step in the process of alining the shaft, the cord or line 11 is secured in a direct line parallel with that in which the shaft is to be alined, so that when the jaws 1 and 2 are clamped upon one part of the shaft and the arm 7 brought to a level the gage 9 is then adjusted along the arm 7 until the point of the plumb 10 registers exactly with the point in the cord 11 at right angles to the shaft.

The bar 7 is provided with suitable graduations 16', along which the gage 9 is movable to determine the exact horizontal distance of the center of the shaft A from the vertical plane of the alining cord 11, and when the shaft has been brought to the desired position at one point the clamping-jaws 1 and 2 may be loosened and moved along the shaft to another point and then reclamped and leveled up in the manner previously described, care being taken to previously clamp the gage 9 in the previous position by means of a thumb-screw 17, so that when the position of the clamping-jaws is changed from one place to another upon the shaft the position of the point of the plumb 10 with reference to the line or cord 11 will quickly determine whether or not this part of the shaft being tested is in alinement, and if not just how much it is out of alinement will be indicated by the gage 9, whereupon the part of the shaft now being alined is adjusted until the point of the plumb comes into direct registration with the cord or line 11.

It is now clearly evident that by making the plumb-sustaining cord, as 18, of piano-wire or similar material, and at the same time bringing the cord 11 to a level position the shaft A may be simultaneously alined in both a horizontal and a vertical position. In other words, it may be brought to an exact level or parallel with the horizontal and vertical planes of the level cord 11.

I have clearly shown how the horizontal adjustment of the shaft is effected, and it is as clearly obvious that the vertical adjustment of said shaft may be effected through the medium of a plumb and its sustaining-wire 18 by allowing the point of the plumb to just touch the cord 11 as the jaws are moved to different positions along the shaft and the arm 7 brought to a level or horizontal position, as indicated by the level 8.

As shown in Fig. 1, the arm 7 is made in sections of convenient length, divided at 20, and their meeting ends provided with a threaded socket and screw, respectively, for attachment one to the other, the section adjacent to the jaw 2 having a threaded end which is screwed into a threaded socket in said jaw, thereby permitting the arm 7 to be detached, and the rods 5 and 6 are also detachable from the arms 3 and 4, so that all the parts may be separated and arranged lengthwise one with the other for convenience in storage, boxing, or transportation. It will also be observed upon reference to Figs. 1 and 2 that the level 8 is provided with a pair of hooks 21, which hook upon the rod 7 and not only have a sliding movement lengthwise of said rod, but permit the level to swing thereon, and thereby automatically adjust itself in the form of a pendant below the rod.

What I claim is—

1. A shaft-alining device, comprising two open-sided jaws having their open sides facing and interlocked with each other, a laterally-projecting rod on one of the jaws, a level slidable upon said rod and means for clamping said jaws upon a shaft.

2. A shaft-alining device, comprising two jaws having sliding interlocking engagement one with the other, each of said jaws being provided with a pendent arm, a guide-rod mounted upon one of the pendent arms and having sliding engagement with the other arm, a second arm projecting laterally from one of the jaws, and a level slidable upon said second arm.

3. In a shaft-alining device, the combination of two opposed jaws and means for drawing them together to engage opposite faces of the shaft, an arm projecting laterally from one of the jaws, a level on said arm for bringing the latter to a level, a gage adjustable on the arm, and a plumb suspended from said gage.

4. In a shaft-alining device, two opposed jaws and means for drawing them together to engage opposite faces of the shaft, one of the jaws being provided with a laterally-projecting arm, a gage slidable lengthwise on the arm and a plumb suspended from the gage for the purpose described.

5. In a shaft-alining device, two opposed jaws having pendent arms, guide-rods mounted upon one of the pendent arms and upon which the other pendent arm is movable, a horizontal bar secured to one of the jaws and a plumb adjustably supported upon said bar.

6. In a shaft-alining device, an open-sided jaw and means to clamp it upon a shaft, a horizontal bar secured to said jaw, a level carried by the bar and a plumb also carried by the bar and adjustable lengthwise thereof.

7. In a shaft-aliner, two opposed jaws each having a pendent arm, and means for drawing said arms together, one of the jaws having a horizontally-projecting bar, the pendent arms of the jaws partially counteracting the weight of the laterally-projecting bar to bring said bar toward a horizontal position.

8. In a shaft-aliner, two opposed jaws each having a pendent arm, and means for drawing said arms together, one of the jaws having a horizontally-projecting bar, the pendent arms of the jaws partially counteracting the weight of the laterally-projecting bar to bring said bar toward a horizontal position, and a gage slidable lengthwise upon said bar.

9. In a shaft-alining device, the combination with a jaw having a laterally-projecting arm, clamping means whereby said jaw may be secured to a shaft, a level mounted upon the bar and movable lengthwise thereon, a gage slidable upon the bar and a plumb suspended from the gage.

10. In a shaft-alining device, the combination of two jaws having sliding interlocking engagement with each other, and each provided with a pendent arm, means for clamping said jaws in their adjusted position, a horizontal bar secured to and projecting from one of the jaws, a level slidable upon the bar, a gage also slidable upon the bar and a plumb suspended from the gage.

In witness whereof I have hereunto set my hand this 23d day of May, 1905.

HARLAN L. NEWTON.

Witnesses:
 ROSCOE SARGENT,
 EARL M. SEVERANCE.